United States Patent
Park et al.

(10) Patent No.: US 12,072,468 B2
(45) Date of Patent: Aug. 27, 2024

(54) COVER WINDOW FOR FLEXIBLE DISPLAY DEVICE AND FLEXIBLE DISPLAY DEVICE

(71) Applicant: LG CHEM, LTD., Seoul (KR)

(72) Inventors: Jin Young Park, Daejeon (KR); Hanna Lee, Daejeon (KR); Kyung Moon Ko, Daejeon (KR); Yongjoon Heo, Daejeon (KR); Yeongrae Chang, Daejeon (KR); Jong Soo Do, Daejeon (KR)

(73) Assignee: LG CHEM, LTD., Seoul (KR)

( * ) Notice: Subject to any disclaimer, the term of this patent is extended or adjusted under 35 U.S.C. 154(b) by 387 days.

(21) Appl. No.: 17/441,095

(22) PCT Filed: May 15, 2020

(86) PCT No.: PCT/KR2020/006410
§ 371 (c)(1),
(2) Date: Sep. 20, 2021

(87) PCT Pub. No.: WO2020/235876
PCT Pub. Date: Nov. 26, 2020

(65) Prior Publication Data
US 2022/0171099 A1    Jun. 2, 2022

(30) Foreign Application Priority Data

May 20, 2019  (KR) .................. 10-2019-0058999
May 14, 2020  (KR) .................. 10-2020-0057915

(51) Int. Cl.
*G02B 1/14* (2015.01)
*B32B 15/088* (2006.01)
(Continued)

(52) U.S. Cl.
CPC .............. *G02B 1/14* (2015.01); *B32B 15/088* (2013.01); *B32B 27/281* (2013.01); *C08J 7/046* (2020.01);
(Continued)

(58) Field of Classification Search
CPC .... G02B 1/14; G02B 1/04; C08J 7/046; C08J 3/24; C08J 7/042; C08J 2333/14;
(Continued)

(56) References Cited

U.S. PATENT DOCUMENTS 5,339,584 A     8/1994   Ohtake et al.
2008/0095997 A1  4/2008   Chiang et al.
(Continued)

FOREIGN PATENT DOCUMENTS

CN     113490975 A    10/2021
DE   102016125930 A1   7/2017
(Continued)

OTHER PUBLICATIONS

International Search Report issued for International Application No. PCT/KR2020/006410 on Aug. 27, 2020, 6 pages.
(Continued)

*Primary Examiner* — John D Freeman
(74) *Attorney, Agent, or Firm* — ROTHWELL, FIGG, ERNST & MANBECK, P.C.

(57) ABSTRACT

The present disclosure relates to a cover window for a flexible display device comprising: a light-transmitting substrate; and a first hard coating layer and a second hard coating layer which are formed on both sides of the light-transmitting substrate, respectively, wherein each of the first hard coating layer and the second hard coating layer has IR spectra in which a ratio of the amide C═O peak to the ester C═O peak is in a predetermined range, and a flexible display device including the cover window for a flexible display device.

14 Claims, 2 Drawing Sheets

(51) Int. Cl.
*B32B 27/28* (2006.01)
*C08J 7/046* (2020.01)
*G02B 1/04* (2006.01)

(52) U.S. Cl.
CPC ............ *G02B 1/04* (2013.01); *B32B 2255/10* (2013.01); *B32B 2255/26* (2013.01); *B32B 2307/412* (2013.01); *B32B 2307/51* (2013.01); *B32B 2307/536* (2013.01); *B32B 2307/546* (2013.01); *B32B 2307/584* (2013.01); *B32B 2457/20* (2013.01)

(58) Field of Classification Search
CPC ................ C08J 2379/08; C08J 2433/06; C08J 2433/08; C08J 2475/14; G09F 9/301; B05D 1/28; B05D 3/0413; B05D 3/067; B05D 7/04; B05D 2201/02; B05D 2252/00; B05D 2502/00; B05D 2503/00; B05D 2701/30; B32B 27/08; B32B 27/34; B32B 2255/10; B32B 2255/26; B32B 2255/28; B32B 2270/00; B32B 2307/21; B32B 2307/306; B32B 2307/412; B32B 2307/418; B32B 2307/51; B32B 2307/536; B32B 2307/546; B32B 2307/584; B32B 2307/732; B32B 2457/20; B32B 2457/206; B32B 2457/208; B32B 2571/00; B32B 7/12; B32B 15/02; B32B 15/043; B32B 15/08; B32B 15/088; B32B 27/281; B32B 27/20; B32B 27/308; C08F 290/067; C08K 3/36; C09D 4/06; C09D 151/08

See application file for complete search history.

(56) References Cited

U.S. PATENT DOCUMENTS

| | | | |
|---|---|---|---|
| 2015/0140279 A1 | 5/2015 | Kang et al. | |
| 2015/0252210 A1 | 9/2015 | Kang et al. | |
| 2015/0252212 A1 | 9/2015 | Kang et al. | |
| 2016/0320803 A1 | 11/2016 | Oh et al. | |
| 2017/0036242 A1 | 2/2017 | Lee et al. | |
| 2017/0121460 A1* | 5/2017 | Hong | ................ C08G 73/1067 |
| 2017/0196101 A1 | 7/2017 | Ki et al. | |
| 2017/0253707 A1 | 9/2017 | Lim et al. | |
| 2017/0364029 A1 | 12/2017 | Cho et al. | |
| 2018/0113350 A1 | 4/2018 | Jee et al. | |
| 2018/0194963 A1 | 7/2018 | Kim et al. | |
| 2018/0201000 A1 | 7/2018 | Kim et al. | |
| 2018/0201002 A1 | 7/2018 | Kim et al. | |
| 2018/0208793 A1 | 7/2018 | Kim et al. | |
| 2018/0215883 A1 | 8/2018 | Park et al. | |
| 2019/0153260 A1 | 5/2019 | Kim et al. | |
| 2019/0350092 A1 | 11/2019 | Jung et al. | |
| 2020/0010736 A1 | 1/2020 | Lee et al. | |

FOREIGN PATENT DOCUMENTS

| | | |
|---|---|---|
| EP | 3915783 A1 | 12/2021 |
| JP | H01-57146 B2 | 12/1989 |
| JP | 2013-502504 A | 1/2013 |
| JP | 2015-061750 A | 4/2015 |
| JP | 2015-523242 A | 8/2015 |
| JP | 2015-527233 A | 9/2015 |
| JP | 2015-534510 A | 12/2015 |
| JP | 2017-156751 A | 9/2017 |
| JP | 2018-525248 A | 9/2018 |
| JP | 2018-525476 A | 9/2018 |
| JP | 2018-528286 A | 9/2018 |
| JP | 2018-530631 A | 10/2018 |
| JP | 2018-536034 A | 12/2018 |
| JP | 6457146 B2 | 1/2019 |
| JP | 2019-105830 A | 6/2019 |
| KR | 10-2017-0016299 A | 2/2017 |
| KR | 10-2017-0017734 A | 2/2017 |
| KR | 10-2017-0026747 A | 3/2017 |
| KR | 10-2017-0038731 A | 4/2017 |
| KR | 10-2017-0141851 A | 12/2017 |
| KR | 10-2018-0044216 A | 5/2018 |
| KR | 10-2018-0101463 A | 9/2018 |
| KR | 10-2019-0037116 A | 4/2019 |
| TW | 201643841 A1 | 12/2016 |

OTHER PUBLICATIONS

Yun Hyeok Kim et al., "Transparent Urethane-Siloxane Hybrid Materials for Flexible Cover Windows with Ceramic-Like Strength, yet Polymer-Like Modulus", ACS Appl. Mater. Interfaces., vol. 10, No. 49, pp. 43122-43130 (Nov. 16, 2018).

* cited by examiner

COVER WINDOW FOR FLEXIBLE DISPLAY DEVICE AND FLEXIBLE DISPLAY DEVICE

CROSS CITATION WITH RELATED APPLICATION(S)

This application is a 35 U.S.C. 371 National Phase Entry Application from PCT/KR2020/006410, filed on May 15, 2020 and designating the United States, claims the benefit of Korean Patent Application No. 10-2019-0058999 filed on May 20, 2019 and Korean Patent Application No. 10-2020-0057915 filed on May 14, 2020 with the Korean Intellectual Property Office, the disclosure of which are incorporated herein by reference in their entirety.

The present disclosure relates to a cover window for a flexible display device, and a flexible display device.

BACKGROUND OF THE INVENTION

Recently, with the development of mobile devices such as smartphones and tablet PC, thinning and slimming of substrates for display are required. Glass or tempered glass is commonly used as a material having excellent mechanical properties on windows or front boards for displays of mobile devices. However, the glass causes the weight increase of the mobile devices due to its own weight, and has a problem of breakage due to an external impact.

Therefore, plastic resin is being studied as a substitute for glass. A plastic resin film is lightweight but hardly has a risk of cracking, and thus is suitable for the trend of pursuing lighter mobile devices. In particular, in order to implement a film having high hardness and abrasion resistance properties, a film for coating a hard coating layer made of plastic resins onto a support substrate has been proposed.

As a method of increasing the surface hardness of the hard coating layer, a method of increasing the thickness of the hard coating layer can be considered. In order to ensure the surface hardness enough to replace the glass, it is necessary to implement a thickness of a certain hard coating layer. However, as the thickness of the hard coating layer is increased, the surface hardness may be increased but the occurrence of wrinkles and curls are increased due to curing shrinkage of the hard coating layer, and at the same time cracking and peeling of the coating layer are likely to occur. Therefore, the practical application of this method is not easy.

Meanwhile, a display in which a part of the display device is bent or flexibly warped for aesthetic and functional reasons has recently been attracting attention, and this tendency is noticeable particularly in mobile devices such as smartphones and tablet PCs. However, since glass is not suitable for use as a cover plate for protecting such a flexible display, it needs to be replaced with a plastic resin or the like. However, for that purpose, it is not easy to produce a thin film having sufficient flexibility while exhibiting a glass level of high hardness.

BRIEF SUMMARY OF THE INVENTION

The present disclosure provides a cover window for a flexible display device which exhibits high hardness while simultaneously satisfying the physical property balance between flexibility and high hardness, in particular, hardly has a risk of damaging the film even in repetitive bending or folding operations, and thus, can be easily applied to bendable, flexible, rollable or foldable mobile devices, display devices, and the like.

The present disclosure also provides a flexible display device including the aforementioned cover window.

Provided herein is a cover window for a flexible display device comprising: a light-transmitting substrate; and a first hard coating layer and a second hard coating layer which are formed on both sides of the light-transmitting substrate, respectively, wherein the first hard coating layer has IR spectra in which a ratio of the amide C=O peak to the ester C=O peak is 0.8 or less, and wherein the second hard coating layer has IR spectra in which a ratio of the amide C=O peak to the ester C=O peak is greater than 0.8.

Also provided herein is a flexible display device comprising the cover window for the flexible display device.

DETAILED DESCRIPTION OF THE INVENTION

Hereinafter, a cover window for a flexible display device and a flexible display device according to specific exemplary embodiments of the present disclosure will be described in more detail.

As used herein, the "flexible" means a state having flexibility to such an extent that cracks of 3 mm or more in length do not occur when wound around a cylindrical mandrel with a diameter of 4 mm Therefore, the flexible plastic film of the present disclosure can be applied to a cover film of a bendable, flexible, rollable, or foldable display or the like.

As used herein, the (meth)acrylate means not only acrylate but also methacrylate.

The light-transmitting substrate may have a transmittance of 50% or more, or a transmittance of 50% to 99.9% at a wavelength of 300 nm or more, or a wavelength of 400 nm to 800 nm.

According to one embodiment of the invention, there can be provided a cover window for a flexible display device comprising: a light-transmitting substrate; and a first hard coating layer and a second hard coating layer which are formed on both sides of the light-transmitting substrate, respectively, wherein the first hard coating layer has IR spectra in which a ratio of the amide C=O peak to the ester C=O peak is 0.8 or less, and wherein the second hard coating layer has IR spectra in which a ratio of the amide C=O peak to the ester C=O peak is greater than 0.8.

The present inventors have conducted research on an optical laminate applicable to a flexible display device having a thinner thickness, and have found that a laminated structure, which is obtained by forming a first hard coating layer in which the ratio of the amide C=O peak to the ester C=O peak is 0.8 or less in IR spectra on the light-transmitting substrate or polymer substrate, and a second hard coating layer in which the ratio of the amide C=O peak to the ester C=O peak in IR spectra is greater than 0.8, has a high hardness and also does not generate cracks when wound around a mandrel with a diameter of 3 mm, and thus, can be easily applied to a cover window for a flexible display device. The present disclosure has been completed on the basis of such findings.

And, the present inventors have found that the cover window for the flexible display device exhibits high hardness while simultaneously satisfying the physical property balance between flexibility and high hardness, in particular, hardly has a risk of damaging the film even in repetitive bending or folding operations, and thus, can be easily applied to bendable, flexible, rollable or foldable mobile devices, display devices, and the like.

Since the cover window for the flexible display device may have physical properties that can replace tempered glass and the like, it can have properties to a degree at which it may not be broken by pressure or force applied from the outside and also can be sufficiently warped and folded.

As described above, the physical properties such as bending durability and surface hardness of the cover window for the flexible display device results from the formation of each of the first hard coating layer and the second hard coating layer having the above properties on the light-transmitting substrate or the polymer substrate.

The ratio of the intensity of the amide C=O peak (about 1690 cm$^{-1}$) to the intensity of the ester C=O peak (about 1724 cm$^{-1}$) in the IR spectrum of the hard coating layer is related to the type and content of the urethane acrylate included in the binder resin included in the hard coating layer. Specifically, the ratio may be related to the molecular weight of the binder resin included in the hard coating layer, the ratio can be related to the toughness and flexibility of the hard coating layer, and it may be related to the detailed structure of the hard coating layer, the type of the detailed repeating unit, or the features such as the size or ratio of the detailed structure or the detailed repeating unit.

The first hard coating layer may have IR spectra in which the ratio of the amide C=O peak to the ester C=O peak is 0.8 or less, or 0.5 to 0.8, or 0.600 to 0.800, or 0.650 to 0.750.

As the first hard coating layer has IR spectra in which the ratio of the amide C=O peak to the ester C=O peak is in the above range, the first hard coating layer can have excellent bending durability while maintaining high hardness, particularly, excellent bending durability under conditions such as low temperature and high temperature/high humidity.

For example, in the cover window for the flexible display device, when the first hard coating layer has IT spectra in which the ratio of the amide C=O peak to the ester C=O peak is greater than 0.8, the surface pencil hardness measured on the first hard coating layer side may be reduced to 4H or less under a load of 750 g, and when configured together with the second hard coating layer, the curl of the coating film may not be maintained.

On the other hand, the second hard coating layer may have IR spectra in which the ratio of the amide C=O peak to the ester C=O peak is greater than 0.8, or 0.820 to 1.500, or 0.825 to 1.200, or 0.830 to 1.100.

As the second hard coating layer has IR spectra in which the ratio of the amide C=O peak to the ester C=O peak is in the above-mentioned range, the second hard coating layer may have properties of being excellent in flexibility and thus improving bending durability, and when configured together with the above-mentioned first hard coating layer, it may have properties of maintaining the curl of the coating film.

For example, in the cover window for the flexible display device, when the second hard coating layer has IR spectra in which the ratio of the amide C=O peak to the ester C=O peak is less than 0.8, the bending durability (5 mm, room temperature) when configured together with the first hard coating layer may be reduced, particularly, the bending durability at a low temperature is reduced. In addition, when configured together with the first hard coating layer, the curl of the coating film may not be maintained.

In the cover window for the flexible display device, the first hard coating layer may be positioned in a direction toward the outside with respect to the light-transmitting substrate, and the second hard coating layer may be positioned in a direction toward the inside of the flexible display device.

That is, on both sides of the light-transmitting substrate included in the cover window for the flexible display device, the first hard coating layer and the second hard coating layer having different properties may be formed, respectively, and it has good curling property and excellent bending durability while maintaining high hardness. In particular, it is excellent in the bending durability at low temperature and high temperature/high humidity.

Further, due to such a structure, it is possible to simultaneously satisfy the physical property balance between flexibility and high hardness, and to prevent damage occurring to the internal structure even by repetitive bending or folding operations. In addition, it can have optical properties such as high transparency along with excellent mechanical properties and heat resistance.

In contrast, when a hard coating layer having the same properties is formed on both sides of the light-transmitting substrate, or when the ratio of the amide C=O peak to the ester C=O peak is not satisfied in the IR spectrum of each of the first hard coating layer and the second hard coating layer, curls may occur on the cover window for the flexible display device, and it may be difficult for the cover window for the flexible display device to implement sufficient bending durability (folding) properties.

The cover window for the flexible display device may have the surface pencil hardness of 5H or more as measured on the first hard coating layer side under a load of 750 g, and when a hard coating layer having a pencil hardness of 5H or more under a load of 750 g is applied together and wound around a mandrel with a diameter of 3 mm, it can have the property of not causing cracks.

Further, due to the structure of the cover window for the flexible display device, it has excellent durability against repeated bending or folding operations applied under low temperature conditions, and it also has excellent durability against repeated bending or folding operations applied under high temperature and high humidity conditions.

More specifically, in the cover window for the flexible display device, cracks may not occur in 50,000 times bending durability tests that are performed around a mandrel with a diameter of 5 mm at a temperature of −20° C.

Also, in the cover window for the flexible display device, cracks may not occur in 100,000 times bending durability tests which are performed around a mandrel with a diameter of 5 mm at a temperature of −20° C. and 90 RH %.

As such, it has high durability against repeated bending or folding operations applied under low temperature conditions or high temperature/high humidity conditions, respectively, thereby preventing the occurrence of cracks in the hard coating layer under severe conditions of the product to which the cover window having the hard coating layer is applied.

Further, the cover window for the flexible display device has high durability against repeated bending even at room temperature while having high surface hardness. Specifically, the cover window for the flexible display device may have a surface pencil hardness of 5H or more as measured on the first hard coating layer side under a load of 750 g, and the cover window for the flexible display device may free from the occurrence of cracks in 200,000 times bending durability tests that are performed around a mandrel with a diameter of 2 mm at a room temperature (25° C.).

Meanwhile, the cover window for the flexible display device of the embodiment may have a light transmittance of 90.0% or more and a haze of 1.0% or less, or 0.7% or less, or 0.5% or less.

Meanwhile, the cover window for the flexible display device preferably includes a light-transmitting substrate that is excellent in optical properties and simultaneously satisfies the physical property balance between flexibility and high hardness in order to realize the above-mentioned properties, and can prevent damage occurring to the internal structure even by repetitive bending or folding operations.

More specifically, the yellow index of the light-transmitting substrate measured in accordance with ASTM D1925 is 4.5 or less or 3.8 or less, and the haze of the light-transmitting substrate measured in accordance with ASTM D1003 may be 1.1% or less, or 0.4 to 0.8%, and thereby, it can exhibit colorless and transparent optical properties.

Further, the light-transmitting substrate has an elastic modulus of 5 GPa or more, or 5 to 10 Gpa, as measured by applying a strain rate of 12.5 mm/min to a sample having a thickness of 50±2 μm, and thereby it can have excellent mechanical properties, high elasticity and bending resistance.

The type of the light-transmitting substrate is not particularly limited as long as it satisfies the above-mentioned properties, but for example, a glass substrate may be used, or a polymer substrate including polyimide, polyamide, polyamideimide, or a mixture thereof, or a copolymer thereof may be used.

As mentioned above, the flexibility can be generally secured in a film or an optical laminate having a thin thickness, but it is not easy to secure durability against repeated bending or folding operations while ensuring high surface strength.

In contrast, the cover window for the flexible display device of the embodiment includes a hard coating layer that can secure durability against repeated bending or folding operations while having high hardness together with the light-transmitting substrate having the above-mentioned properties, and thereby, can have the above-mentioned properties.

Specifically, the hard coating layer may include a binder resin.

Specific examples of the binder resin are not limited, and for example, the binder resin may be a polymer or copolymer of monomer(s) having a photocurable reactive group, and specifically, it may be a polymer or copolymer formed from (meth)acrylate-based monomers or oligomers, vinyl-based monomers or oligomers, and the like.

As an example, the binder resin may include a polymer or copolymer of a 1- to 6-functional (meth)acrylate-based monomer.

The 1- to 6-functional acrylate-based mononer or oligomer may include trimethylolpropane triacrylate (TMPTA), trimethylolpropaneethoxy triacrylate (TMPEOTA), glycerin propoxylated triacrylate (GPTA), pentaerythritol tetraacrylate (PETA), dipentaerythritol hexaacrylate (DPHA), and the like. The 1- to 6-functional acrylate-based mononer or oligomer may be used alone or in combination of different types.

The (meth)acrylate-based monomer or oligomer, vinyl-based monomer or oligomer may have a weight average molecular weight (Mw) ranging from about 200 to about 2,000 g/mol, or from about 200 to about 1,000 g/mol, or about 200 to about 500 g/mol.

The 1- to 6-functional acrylate-based binder has an acrylate equivalent weight ranging from about 50 to about 300 g/mol, or from about 50 to about 200 g/mol, or from about 50 to about 150 g/mol.

Further, the binder resin may include a cross-linked copolymer of a 1- to 6-functional acrylate-based monomer and a 7- to 20-functional urethane acrylate-based monomer or oligomer.

The 7- to 20-functional urethane acrylate-based monomer or oligomer is subjected to crosslinking polymerization with the 1- to 6-functional acrylate-based monomer or oligomer to form a copolymer, and high hardness, flexibility and impact resistance can be imparted to the coating layer formed after curing. The 7- to 20-functional urethane acrylate-based monomer or oligomer may be used alone or in combination of different types.

The cross-linked copolymer may be one in which the 1- to 6-functional acrylate-based monomer or oligomer and the 7- to 20-functional urethane acrylate-based monomer or oligomer are subjected to crosslinking polymerization at a weight ratio of about 1:9 to about 5:5, preferably about 1:9 to about 4:6, more preferably about 1:9 to about 3.5:6.5. By including a crosslinked copolymer in which the 1- to 6-functional acrylate-based monomer or oligomer and the 7- to 20-functional urethane acrylate-based monomer or oligomer are cross-linked in the above weight ratio, it can exhibit sufficient flexibility and at the same time achieve high hardness and good physical properties.

The 7- to 20-functional urethane acrylate-based oligomer has a weight average molecular weight in the range of about 2,000 to about 8,000 g/mol, or about 3,000 to about 6,000 g/mol, or about 3,000 to about 5,000 g/mol, which may be preferable for the optimization of physical properties of the coating layer.

Meanwhile, as described above, the ratio of the intensity of the amide C=O peak (about 1690 cm$^{-1}$) to the intensity of the ester C=O peak (about 1724 cm$^{-1}$) in the IR spectra of the hard coating layer is related to the type and content of the urethane acrylate included in the binder resin included in the hard coating layer. Specifically, the ratio may be related to the molecular weight of the binder resin included in the hard coating layer, the ratio can be related to the toughness and flexibility of the hard coating layer, and it may be related to the detailed structure of the hard coating layer, the type of the detailed repeating unit, or the features such as the size or ratio of the detailed structure or the detailed repeating unit.

Accordingly, the first hard coating layer may have IR spectra in which the ratio of the amide C=O peak to the ester C=O peak is 0.8 or less, and the second hard coating layer may have IR spectra in which the ratio of the amide C=O peak to the ester C=O peak is greater than 0.8. In order to satisfy this, the first hard coating layer may include a binder resin containing a cured product between a (meth)acrylic-based polymer having a weight average molecular weight of 10,000 to 200,000 and a (meth)acrylate compound, and fine inorganic particles dispersed in the binder resin.

Accordingly, the first hard coating layer may have IR spectra in which the ratio of the amide C=O peak to the ester C=O peak is 0.8 or less, and the second hard coating layer may have IR spectra in which the ratio of the amide C=O peak to the ester C=O peak is greater than 0.8. In order to satisfy this, the first hard coating layer may include a binder resin containing a cured product between a (meth)acrylic-based polymer having a weight average molecular weight of 10,000 to 200,000 and a (meth)acrylate compound, and fine inorganic particles dispersed in the binder resin.

In the IR spectrum of the first hard coating layer, the ratio of the ester C=O peak to the amide C=O peak appears relatively high, which may result from the inclusion of the (meth)acrylic-based polymer having a weight average molecular weight of 10,000 to 200,000 in the binder resin.

In addition, by allowing the binder resin included in the first hard coating layer to contain a polyfunctional (meth) acrylate compound in a predetermined amount together with the (meth)acrylic-based polymer having a weight average molecular weight of 10,000 to 200,000, it can exhibit the above-mentioned properties.

For example, the binder resin included in the first hard coating layer includes 50 to 85% by weight of a portion derived from an 8- to 12-functional (meth)acrylate compound and also includes 5 to 40% by weight of the portion derived from the (meth)acrylic polymer having a weight average molecular weight of 10,000 to 200,000, thereby being able to satisfy the above-mentioned properties.

More specifically, the binder resin included in the first hard coating layer may include a copolymer formed from a mixture containing 5 to 40% by weight of a (meth)acrylic polymer having a weight average molecular weight of 10,000 to 200,000; 50 to 85% by weight of an 8- to 12-functional (meth)acrylate compound; and 5 to 40% by weight of a 1- to 6-functional (meth) acrylate compound.

Accordingly, the second hard coating layer may include a binder resin derived from a (meth)acrylate compound and fine inorganic particles dispersed in the binder resin, within the range satisfying the condition that the ratio of the amide C=O peak to the ester C=O peak in the IR spectrum is greater than 0.8.

More specifically, the binder resin included in the second hard coating layer may include a copolymer formed from a mixture containing 40 to 85% by weight of an 8- to 12-functional (meth)acrylate compound; and 15 to 60% by weight of a 1- to 6-functional (meth)acrylate compound.

Due to the above-mentioned difference, the ratio of the amide C=O peak to the ester C=O peak may be varied in the IR spectrum of each of the first hard coating layer and the second hard coating layer.

Further, the hard coating layer may include fine inorganic particles dispersed in the binder resin.

The inorganic particles may be, for example, metal atoms such as silica, aluminum, titanium, or zinc, or oxides or nitrides thereof, and the like, and each may be independently silica fine particles, aluminum oxide particles, titanium oxide particles, or zinc oxide particles or the like.

The fine inorganic particles may have an average radius of 100 nm or less, or 5 to 100 nm.

The hard coating layer may include two or more kinds of fine inorganic particles having an average radius different from that of the binder resin. In this case, the two or more kinds of inorganic particles may include first inorganic particles having an average radius of 20 to 35 nm and second inorganic particles having an average radius of 40 to 130 nm.

The average radius of each of the first inorganic particles and the second inorganic particles can be confirmed through a commonly known method. For example, the average radius can be calculated and derived by measuring the radius of individual particles confirmed in the electron micrograph (SEM, TEM, etc.) of the above hard coating layer, or it can be the average radius of the inorganic particles calculated by the X-ray scattering experiment.

Meanwhile, the content of the fine inorganic particles included in the hard coating layer is not particularly limited, but preferably, the hard coating layer may include 40 to 100 parts by weight, or 30 to 100 parts by weight of the fine inorganic particles, based on 100 parts by weight of the binder resin. That is, the first hard coating layer includes 30 to 100 parts by weight of the fine inorganic particles relative to 100 parts by weight of the binder resin, and the second hard coating layer may include 30 to 100 parts by weight of the fine inorganic particles relative to 100 parts by weight of the binder resin.

When the content of the fine inorganic particles included in the hard coating layer is too small, the hardness of the hard coating layer may be lowered. Further, when the content of the fine inorganic particles included in the hard coating layer is too high, the hardness may be increased, but the flexibility of the cover window may be significantly reduced, or the durability against repeated bending or folding operations may also be reduced.

The cover window for the flexible display device simultaneously satisfies the physical property balance between flexibility and high hardness even in a thin thickness range compared to other previously known optical laminates, can prevent damage occurring to the internal structure even by repetitive bending or folding operations, and can have optical properties such as high transparency along with high mechanical properties and heat resistance.

More specifically, the light-transmitting substrate may have a thickness of 5 μm to 100 μm, or a thickness of 10 μm to 80 μm, or a thickness of 20 μm to 60 μm. When the thickness of the substrate is less than 5 μm, breakage or curl is likely to occur during the coating layer forming process, and it may be difficult to achieve high hardness. On the other hand, when the thickness exceeds 100 μm, the flexibility is reduced, which make it difficult to form a flexible film.

The hard coating layer may have a thickness of 1 μm to 20 μm, or 3 μm to 15 μm. When the thickness of the hard coating layer becomes excessively large, the flexibility of the cover window for the flexible display device, the durability against repeated bending or folding operations, or the like, may be deteriorated.

Meanwhile, the cover window for the flexible display device can be provided by coating the coating composition for forming the hard coating layer on at least one surface of the light-transmitting substrate and then photo-curing it.

The method of coating the coating composition is not particularly limited as long as it can be used in the technical field to which the present technology belongs, and for example, a bar coating method, a knife coating method, a roll coating method, a blade coating method, a die coating method, a micro gravure coating method, a comma coating method, a slot die coating method, a lip coating method, a solution casting method, or the like can be used.

At least one selected from a layer, a membrane, a film or the like such as a plastic resin film, a cohesive film, a release film, a conductive film, a conductive layer, a liquid crystal layer, a coating layer, a cured resin layer, a non-conductive film, a metal mesh layer or a patterned metal layer may be further included on the top surface of the hard coating layer or between the light-transmitting substrate or polymer substrate and the hard coating layer.

For example, an antistatic layer having conductivity is first formed on a substrate, and then a coating layer is formed thereon to provide an anti-static function, or a low refractive index layer is introduced on the coating layer to implement a low reflection function.

Further, the layer, membrane, film or the like may be in any form of a single layer, a double layer, or a laminate type. The layer, membrane, film or the like may be formed by laminating a freestanding film with an adhesive, a cohesive film, or the like, or may be laminated on the coating layer by a method such as coating, vapor deposition, sputtering, or the like, but the present disclosure is not limited thereto.

Meanwhile, the hard coating layer may further include components commonly used in the art, such as a photoinitiator, an organic solvent, a surfactant, a UV absorber, a UV stabilizer, an anti-yellowing agent, a leveling agent, an antifouling agent, a dye for improving the color value, etc., in addition to the above-mentioned binder resin, inorganic fine particles and the like. Further, since the content thereof can be variously adjusted within the range that does not deteriorate the physical properties of the hard coating layer, it is not particularly limited. However, for example, they may be contained in an amount of about 0.01 to about 30 parts by weight based on about 100 parts by weight of the hard coating layer.

The surfactant may be a mono- or bi-functional fluorine-based acrylate, a fluorine-based surfactant, or a silicon-based surfactant. In this case, the surfactant may be included in a form of being dispersed or crosslinked in the crosslinked copolymer.

Further, the additive may include a UV absorber, or a UV stabilizer, and the UV absorber may include a benzophenone-based compound, a benzotriazole-based compound, a triazine-based compound or the like. The UV stabilizer may include tetramethyl piperidine or the like.

The photoinitiator may include 1-hydroxy-cyclohexyl-phenyl ketone, 2-hydroxy-2-methyl-1-phenyl-propanone, 2-hydroxy-1-[4-(2-hydroxyethoxy)phenyl]-2-methyl-1-propanone, methylbenzoylformate, α,α-dimethoxy-α-phenyl acetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone diphenyl(2,4,6-trimethylbenzoyl)-phosphine oxide, or bis(2,4,6-trimethylbenzoyl)-phenylphosphine oxide, and the like, but are not limited thereto. In addition, commercially available products include Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, and the like. These photoinitiators can be used alone or in combination of two or more thereof.

The organic solvent may include alcohol based solvents such as methanol, ethanol, isopropyl alcohol and butanol; alkoxy alcohol based solvents such as 2-methoxyethanol, 2-ethoxyethanol and 1-methoxy-2-propanol; ketone based solvents such as acetone, methyl ethyl ketone, methyl isobutyl ketone, methyl propyl ketone and cyclohexanone; ether based solvent such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethyl glycol monopropyl ether, diethyl glycol monobutyl ether and diethylene glycol-2-ethylhexyl ether; aromatic solvent such as benzene, toluene and xylene, and the like. These may be used alone or in combination.

Meanwhile, according to another exemplary embodiment of the disclosure, a flexible display device including the cover window for a flexible display device of the exemplary embodiment can be provided.

The flexible display device includes a curved, bendable, flexible, rollable or foldable-shaped mobile communication terminal, a touch panel of a smartphone or a tablet PC, and cover substrate or element substrate of various displays.

An example of the display device may be a flexible light emitting element display device.

For example, in the organic light emitting diode (OLED) display, the cover window for the flexible display device may be positioned at an outer portion in a direction in which light or a screen is emitted, and a cathode providing electrons, an electron transport layer, an emission layer, a hole transport layer, and an anode providing holes may be sequentially formed.

Further, the organic light emitting diode (OLED) display may further include a hole injection layer (HIL) and an electron injection layer (EIL).

In order to allow the organic light emitting diode (OLED) display to serve and act as a flexible display, in addition to using the polymer film as the cover window, a material having predetermined elasticity may be used in negative and positive electrodes and each of the constituent components.

Another example of the flexible display device may be a rollable display or foldable display device.

The rollable display may have various structures according to an application field, a specific shape, and the like. For example, the rollable display device may have a structure including a cover plastic window, a touch panel, a polarizing plate, a barrier film, a light emitting element (OLED element, or the like), a transparent substrate, or the like.

Advantageous Effects

According to the present disclosure, a cover window for a flexible display device, which exhibits high hardness while simultaneously satisfying the physical property balance between flexibility and high hardness, in particular, hardly has a risk of damaging the film even in repetitive bending or folding operations, and thus, can be easily applied to bendable, flexible, rollable or foldable mobile devices, display devices, and the like, and a flexible display device including the over window, can be provided.

Since the cover window for a flexible display device may have physical properties that can replace tempered glass and the like, the cover window may have properties to a degree at which it may not be broken by pressure or force applied from the outside and also can be sufficiently warped and folded. Further, the cover window exhibits flexibility, bending property, high hardness, scratch resistance and high transparency, and hardly has a risk of damaging the film even in repetitive, continuous bending or long-time folding state. Therefore, the cover window can be usefully applied to bendable, flexible, rollable or foldable mobile devices, display devices, front boards and display unit of various instrument panels, and the like.

Hereinafter, the operation and effect of the invention will be described in more detail by way of concrete examples. However, these examples are merely presented for illustrative purposes only, and the scope of the invention is not determined thereby.

Preparation Example: Preparation of Coating Liquid for Forming Hard Coating Layer Preparation Example 1-1

20 g of trimethylolpropane triacrylate (TMPTA) (manufactured by Cytec, Mw=296 g/mol, acrylate group equivalent weight=99 g/mol) as a trifunctional acrylate-based compound, 30 g of MU9800 (manufactured by Miwon, Mw=3500 g/mol, acrylate group equivalent weight=389 g/mol) as a 9-functional urethane acrylate-based compound, 30 g of MU9020 (manufactured by Miwon, Mw=4500 g/mol, acrylate group equivalent weight=450 g/mol) as a 10-functional urethane acrylate-based compound, 40 g of a binder solution in which SMP-250AP (acrylic polymer, manufactured by Kyoeisha Chemical, acrylate group equivalent weight=240 to 260 g/mol, weight average molecular weight (Mw): 37,000) as an acrylate-based polymer compound was dissolved in propylene glycol monomethyl ether in an amount of 50 wt %, 1 g of Irgacure 184 (manufactured by Ciba) as a photoinitiator, and 20 g of methyl ethyl ketone (MEK) were mixed to prepare an acrylate solution.

60 g of a solution in which a silica particle S1 (average particle diameter of 20 nm, surface-modified with methacrylate silane coupling agent) was dispersed in n-butyl acetate in an amount of 50 wt. %, and 100 g of a solution in which a silica particle S2 (average particle diameter of 40 nm, surface-modified with an acrylate silane coupling agent) was dispersed in methyl ethyl ketone (MEK) in an amount of 30 wt. % were mixed with the resulting acrylate solution to prepare a coating liquid for forming hard coating layer.

Preparation Examples 1-2 to 1-7

A coating solution for forming a hard coating layer was prepared in the same manner as in Preparation Example 1-1, except that the contents of the used components were adjusted as shown in Table 1 below.

Preparation Example 2-1

30 g of MU9800 (manufactured by Miwon, Mw=3500 g/mol, acrylate group equivalent weight=389 g/mol) as a 9-functional urethane acrylate-based compound, 40 g of MU9020 (manufactured by Miwon, Mw=4500 g/mol, acrylate group equivalent weight=450 g/mol) as a 10-functional urethane acrylate-based compound, PU340 (manufactured by Miwon, Mw=2400 g/mol, acrylate group equivalent weight=800 g/mol) as a 3-functional urethane acrylate-based compound, 1 g of Irgacure 184 (manufactured by Ciba) as a photoinitiator, and 40 g of methyl ethyl ketone (MEK) were mixed to prepare an acrylate solution.

50 g of a solution in which a silica particle S1 (average particle diameter of 20 nm, surface-modified with methacrylate silane coupling agent) was dispersed in n-butyl acetate in an amount of 50 wt. %, and 100 g of a solution in which a silica particle S2 (average particle diameter of 40 nm, surface-modified with an acrylate silane coupling agent) was dispersed in methyl ethyl ketone (MEK) in an amount of 30 wt % were mixed with the resulting acrylate solution to prepare a coating liquid for forming hard coating layer.

TABLE 1

| | Manufacturer, Product name | Preparation Example 1-1 | Preparation Example 1-2 | Preparation Example 1-3 | Preparation Example 1-4 | Preparation Example 1-5 | Preparation Example 1-6 | Preparation Example 1-7 | Preparation Example 2-1 |
|---|---|---|---|---|---|---|---|---|---|
| Acrylate-based compound/ polymer (unit: g) | TMPTA | 20 | 10 | 10 | 20 | 30 | 50 | | |
| | MU9800 | 30 | 30 | 30 | 30 | 30 | 40 | 30 | 30 |
| | MU9020 | 30 | 40 | 30 | 30 | 40 | 10 | 20 | 40 |
| | SMP-250AP | 20 | 20 | 30 | 20 | | | 50 | |
| | PU340 | | | | | | | | 30 |
| Inorganic fine particles* (unit: g) | S1 | 30 | 30 | 30 | 30 | 30 | 30 | 30 | 30 |
| | S2 | 30 | 30 | 30 | 30 | 30 | 30 | 30 | 30 |
| Photoinitiator Irgacure 184 | | 1 | 1 | 1 | 1 | 1 | 1 | 1 | 1 |
| Organic solvent MEK | | 20 | 20 | 10 | 20 | 40 | 40 | 40 | 40 |

*In Table 1, the content of the inorganic fine particles is represented by the net weight of only the inorganic fine particles excluding the solvent according to the weight percentage of the inorganic fine particles dispersed in the solvent.

Examples and Comparative Examples: Cover Window for Flexible Display Device

A coating solution for forming a hard coating layer described in Table 2 below was coated onto both sides of a 50 μm thick polyimide substrate (product name: A-50-D, manufactured by Kolon Industries, modulus (measured by UTM: 6.1 GPa)) by a bar coating method, and dried at 90° C. for 2 minutes under an air atmosphere. It was photo-cured with a metal halide lamp (light quantity: 200 mJ/cm$^2$) having a wavelength of 290 to 320 nm to form an optical laminate. After curing was completed, the thickness of the coating layers formed on both sides was 10 μm, respectively.

At this time, the hard coating layer formed on one side of the polyimide substrate using the coating solution for forming the hard coating layer of Preparation Example 1-1 to Preparation Example 2-1 was analyzed using FT-IR (Fourier-transform infrared spectroscopy; FTS 3000), and the resolution was measured using a resolution of 4 cm$^{-1}$ and a scan number of 64 in the wavenumber range of 650 to 4000 cm$^{-1}$ under the ATR (attenuated total reflectance)-IR mode conditions. From the measurement result, the ratio of the intensity of the amide C=O peak (about 1690 cm$^{-1}$) to the intensity of the ester C=O peak (about 1724 cm$^{-1}$) was calculated.

TABLE 2

| Category | Preparation Example 1-1 | Preparation Example 1-2 | Preparation Example 1-3 | Preparation Example 1-4 | Preparation Example 1-5 | Preparation Example 1-6 | Preparation Example 1-7 | Preparation Example 2-1 |
|---|---|---|---|---|---|---|---|---|
| Ratio of amide C=O peak to ester C=O peak in IR spectrum | 0.654 | 0.736 | 0.748 | 0.675 | 0.399 | 0.352 | 0.874 | 0.834 |

Experimental Example: Measurement of Physical Properties of Optical Laminates

Experimental Example 1: Pencil Hardness

For the hard coating layer formed in the front face of the cover window of each of Examples and Comparative Examples, the maximum hardness without scratches was confirmed after moving the pencil back and forth three times at an angle of 45 degrees under a load of 750 g using a pencil hardness tester in accordance with standard JIS K5400-5-4.

Experimental Example 2: Transmittance and Haze

For the cover window of each of Examples and Comparative Examples, the transmittance and haze were measured using a spectrophotometer (apparatus name: COH-400).

Experimental Example 3: Bending Test

The cover window of each of Examples and Comparative Examples was interposed and wound between cylindrical mandrels of various diameters, and then the minimum diameter at which no cracks occurred was measured.

Experimental Example 4: Adhesion of Coating Layer

The front face of the hard coating layer formed in the front face of the cover window of each of Examples and Comparative Examples was cut and scratched with a knife to form 100 grids within the size of 1 cm*1 cm~2 cm*2 cm. Then, Nichiban tape (CT-24) was attached to the cut surface to proceed a peel test. The peel test was performed twice on the same side, and the adhesive strength was evaluated from 5B (no peeling) level to 0B (front peeling) according to the peeled level (5B excellent).

5B: (no peeling)
4B (1 to 5 grids containing peeled parts)
3B (6 to 15 grids containing peeled parts)
2B (16 to 35 grids including peeled parts)
1B (36 to 50 grids containing peeled parts)
0B (51 or more grids containing peeled parts)

Experimental Example 5: Evaluation of Scratch Resistance

The hard coating layer formed in the front face of the cover window of each of Examples and Comparative Examples was rubbed back and forth 500 times at a speed of 30 rpm with a steel wool (#0000) under a load of 500 gf to confirm the surface of the hard coating film. It was determined as excellent if the number of scratches of 1 cm or less observed with the naked eye was 1 or less.

Experimental Example 6: Bending Durability Test

Figure 1:
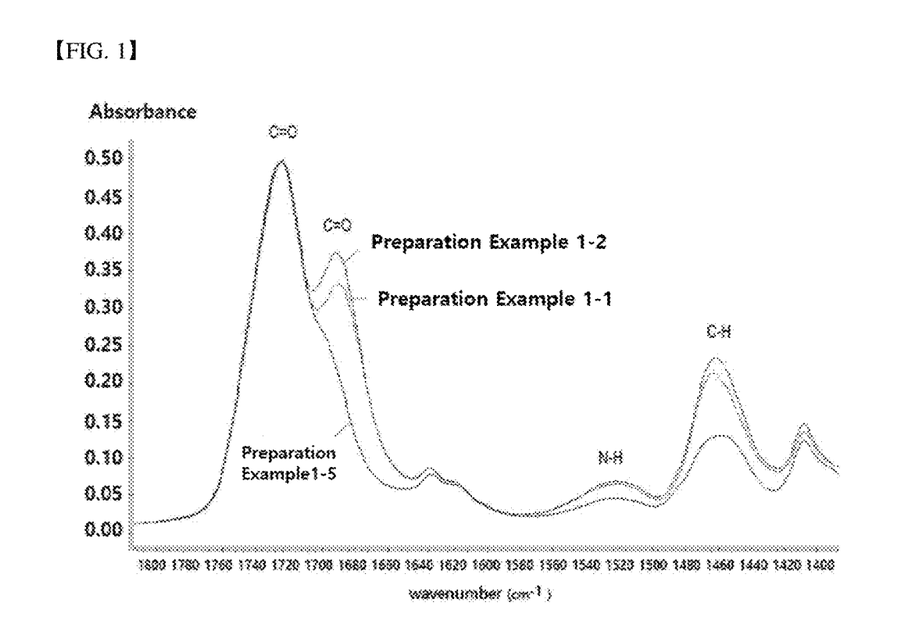
FIG. 1 shows the IR spectrum of the hard coating layer obtained in Preparation Example 1-1, Preparation Example 1-2, and Preparation Example 1-5, respectively.
Figure 2:
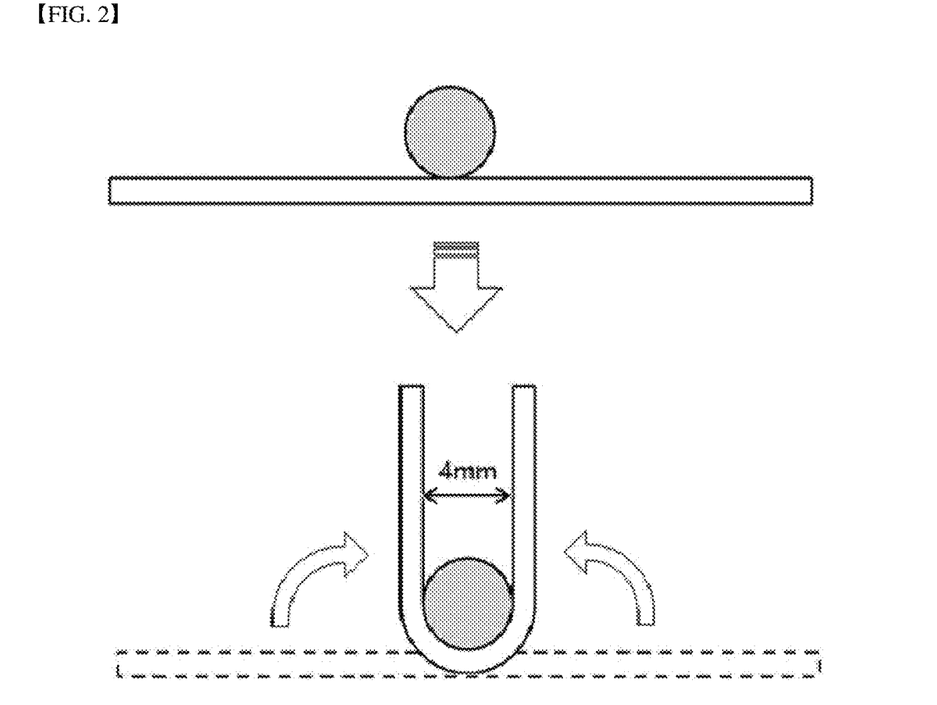
FIG. 2 schematically shows the method of performing the bending durability and bending stability tests of Experimental Examples 7 and 8.

FIG. 2 is a diagram schematically illustrating a method for performing a bending durability and bending stability test for a film according to an exemplary embodiment of the present disclosure.

Each of the films of Examples and Comparative Examples was cut, but laser cutting was performed into a size of 80×140 mm so as to minimize fine cracks at the edge portions. The laser cut film was placed on the measuring equipment and set so that the interval between the folded portions was 4 mm. Then, processes of folding and spreading both sides of the films at 90 degrees toward the bottom surface at room temperature were repeated 10,000 times (the speed at which the film was folded was once every 1.5 seconds).

After repeating 10,000 times, the film was peeled off, and it was observed whether cracking of 3 mm or more in length occurred (OK, NG). When cracks did not occur, the film was again bent 10,000 times and whether or not cracks occurred were repeatedly observed, thereby measuring the maximum number of repetitions that cracks do not occur.
(Temperature and Humidity Conditions)
 1) room temperature: 25° C.
 2) low temperature: −20° C.
 3) high temperature/high humidity: 60° C./90 RH %

The measurement results of the physical properties of Examples and Comparative Examples are shown in Table 3 below.

TABLE 3

| | Example 1 | Example 2 | Example 3 | Example 4 | Comparative Example 1 | Comparative Example 2 | Comparative Example 3 |
|---|---|---|---|---|---|---|---|
| First hard coating layer | Preparation Example 1-1 | Preparation Example 1-2 | Preparation Example 1-3 | Preparation Example 1-4 | Preparation Example 1-5 | Preparation Example 1-6 | Preparation Example 1-7 |
| Second hard coating layer | Preparation | Preparation | Preparation | Preparation | Preparation | Preparation | Preparation |

TABLE 3-continued

|  | Example 1 | Example 2 | Example 3 | Example 4 | Comparative Example 1 | Comparative Example 2 | Comparative Example 3 |
|---|---|---|---|---|---|---|---|
|  | Example 2-1 | Example 2-1 | Example 2-1 | Example 2-1 | Example 2-1 | Example 2-1 | Example 2-1 |
| Transmittance (%) | 91.9 | 91.7 | 92.1 | 91.9 | 91.9 | 92.0 | 91.8 |
| Haze(%) | 0.50 | 0.40 | 0.36 | 0.65 | 0.50 | 0.40 | 0.40 |
| Adhesion of coating layer | OK | OK | OK | OK | OK | OK | OK |
| Scratch resistance | Excellent | Excellent | Excellent | Excellent | Excellent | Excellent | Excellent |
| Pencil hardness | 6 H | 7 H | 6 H | 7 H | 6 H | 8 H | 3 H |
| Bending test | 2 mm | 2 mm | 2 mm | 2 mm | 4 mm | 6 mm | 3 mm |
| Bending durability (25° C., 5 mm) | 100,000 times Ok | 100,000 times Ok | 100,000 times Ok | 100,000 times Ok | 100,000 times Ok | NG | 100,000 times Ok |
| Bending durability (100,000 times, 25° C., 2 mm) | 100,000 times Ok | 100,000 times Ok | 100,000 times Ok | 100,000 times Ok | 100,000 times Ok | NG | 100,000 times Ok |
| Bending durability (200,000 times, 25° C., 2 mm) | 200,000 times Ok | 200,000 times Ok | 200,000 times Ok | 200,000 times Ok | NG | NG | 200,000 times Ok |
| Low-temperature bending durability (−20° C., 5 mm) | 50,000 times OK | 50,000 times OK | 50,000 times OK | 50,000 times OK | NG | NG | NG |
| High-temperature/ high humidity durability (60° C., 90 RH%) 5 mm) | 100,000 times Ok | 100,000 times Ok | 100,000 times Ok | 100,000 times Ok | NG | NG | 100,000 times Ok |

As shown in Table 3, it was confirmed that the cover windows for flexible display devices of Examples have sufficient flexibility while exhibiting a glass level of high hardness, in particular, hardly has a risk of damaging the film even in repetitive bending or folding operations, and thus, can be easily applied to bendable, flexible, rollable or foldable mobile devices, display devices, and the like.

On the other hand, the films of Comparative Examples had lowered pencil hardness or did not exhibit sufficient bending durability to be suitable for cover windows for flexible display devices.

The invention claimed is:

1. A cover window for a flexible display device comprising:
    a light-transmitting substrate, a first hard coating layer and a second hard coating layer, wherein the first hard coating layer is formed one side of the light-transmitting substrate and the second hard coating layer is formed on the other side of the light-transmitting substrate,
    wherein the first hard coating layer has IR spectra in which a ratio of an amide C=O peak to an ester C=O peak is 0.5 to 0.8, and
    wherein the second hard coating layer has IR spectra in which a ratio of an amide C=O peak to an ester C=O peak is greater than 0.8.

2. The cover window for a flexible display device according to claim 1, wherein
    the ratio of the amide C=O peak to the ester C=O peak in the IR spectra of the second hard coating layer is 0.820 to 1.500.

3. The cover window for a flexible display device according to claim 1, wherein
    cracks do not occur in 50,000 times bending durability tests that are performed around a mandrel with a diameter of 5 mm at a temperature of −20° C.

4. The cover window for a flexible display device according to claim 1, wherein:
    cracks do not occur in 100,000 times bending durability tests that are performed around a mandrel with a diameter of 5 mm at a temperature of 60° C. and 90 RH %.

5. The cover window for a flexible display device according to claim 1, wherein
    a pencil hardness of a surface measured on the first hard coating layer side is 5H or more under a load of 750 g, and
    cracks do not occur in 200,000 times bending durability tests that are performed around a mandrel with a diameter of 2 mm at a temperature of 25° C.

6. The cover window for a flexible display device according to claim 1, wherein
    an elastic modulus of the light-transmitting substrate is at least 5 GPa as measured by applying a strain rate of 12.5 mm/min.

7. The cover window for a flexible display device according to claim 6, wherein the light-transmitting substrate comprises at least one polymer selected from the group consisting of polyimide, polyamide, and polyamideimide.

8. The cover window for a flexible display device according to claim 1, which has a light transmittance of 90.0% or more at a wavelength region of 550 nm and a haze value of 1.00% or less.

9. The cover window for a flexible display device according to claim 1, wherein
the light-transmitting substrate has a thickness of 5 to 100 μm, and
each of the first and second hard coating layers has a thickness of 1 to 20 μm.

10. The cover window for a flexible display device according to claim 1, wherein
the first hard coating layer comprises a binder resin containing a cured product between a (meth)acrylic-based polymer having a weight average molecular weight of 10,000 to 200,000 and at least one (meth)acrylate compound, and fine inorganic particles dispersed in the binder resin, and
the second hard coating layer comprises a binder resin derived from at least one (meth)acrylate compound and fine inorganic particles dispersed in the binder resin.

11. The cover window for a flexible display device according to claim 10, wherein:
the binder resin contained in the first hard coating layer comprises a copolymer formed from a mixture containing 5 to 40% by weight of a (meth)acrylic-based polymer having a weight average molecular weight of 10,000 to 200,000; 50 to 85% by weight of an 8- to 12-functional (meth)acrylate compound; and 5 to 40% by weight of a 1- to 6-functional (meth)acrylate compound.

12. The cover window for a flexible display device according to claim 10, wherein:
the binder resin contained in the second hard coating layer comprises a copolymer formed from a mixture containing 40 to 85% by weight of an 8- to 12-functional (meth)acrylate compound; and 15 to 60% by weight of a 1- to 6-functional (meth)acrylate compound.

13. The cover window for a flexible display device according to claim 10, wherein:
the first hard coating layer comprises 30 to 100 parts by weight of the fine inorganic particles relative to 100 parts by weight of the binder resin, and
the second hard coating layer comprises 30 to 100 parts by weight of the fine inorganic particles relative to 100 parts by weight of the binder resin.

14. A flexible display device comprising the cover window for the flexible display device according to claim 1.

* * * * *